Sept. 26, 1950 A. S. WHITE ET AL 2,523,348

RADIO FREQUENCY ROTATING JOINT FOR MULTIPLE FEEDS

Filed Jan. 29, 1948 2 Sheets-Sheet 1

INVENTORS.
ALBERT S. WHITE
WILLIAM H. RHODES
BY Wade Koontz AND
ATTORNEY
James S. Shannon
AGENT

RADIO FREQUENCY ROTATING JOINT FOR MULTIPLE FEEDS

Filed Jan. 29, 1948 2 Sheets-Sheet 2

INVENTORS.
ALBERT S. WHITE
WILLIAM H. RHODES
BY Wade Koontz AND
ATTORNEY
James S. Shannon
AGENT Patented Sept. 26, 1950 2,523,348

UNITED STATES PATENT OFFICE 2,523,348

RADIO FREQUENCY ROTATING JOINT FOR MULTIPLE FEEDS

Albert S. White, Rumson, N. J., and William H. Rhodes, Baltimore, Md.

Application January 29, 1948, Serial No. 5,160

5 Claims. (Cl. 178—44)

(Granted under the act of March 3, 1883, as amended April 30, 1928; 370 O. G. 757)

The invention described herein may be manufactured and used by or for the Government for governmental purposes without payment to us of any royalty thereon.

This invention relates to a rotating coupling network capable of transmitting a plurality of high frequency waves of different frequencies between a plurality of fixed circuits and a plurality of circuits rotating about a common center.

In the case, for example, where a number of antennas are mounted on a rotating structure the problem arises of feeding energy to these antennas from stationary transmitters. In the case of two feeds this problem has been solved by the use of two concentrically arranged coaxial lines having their common axis located at the center of rotation of the revolving antenna structure. However, for more than two feeds this method becomes too complicated.

It is therefore the object of this invention to provide a simple and practical coupling network for transmitting energy between a number of fixed circuits, which may be more than two, and a corresponding number of rotating circuits without any intercoupling between the various circuits. This is accomplished by providing a number of stationary filters each coupled to one of the stationary circuits and designed to pass the frequency band of that circuit and to exclude the frequencies of the other circuits. A like filter arrangement is also provided on the rotating structure with each filter being identical to and corresponding to one of the stationary filters and each being coupled to one of the circuits on the rotating structure. An interconnecting transmission line containing a rotating joint is provided between the two filter arrangements, with the stationary filters coupled to one end of this line and the filters on the rotating structure coupled to the other end. The interconnecting line therefore transmits the frequencies of all the circuits while the two filter arrangements insure, for both directions of transmission, that the frequencies in each circuit on one side of the rotating joint will appear only in its corresponding circuit on the other side. For the higher frequencies the filters may conveniently be resonant cavities and the interconnecting transmission line may be a wave guide or a coaxial transmission line.

Specific embodiments of the invention are shown in the accompanying drawing in which.

Figures 1, 2:
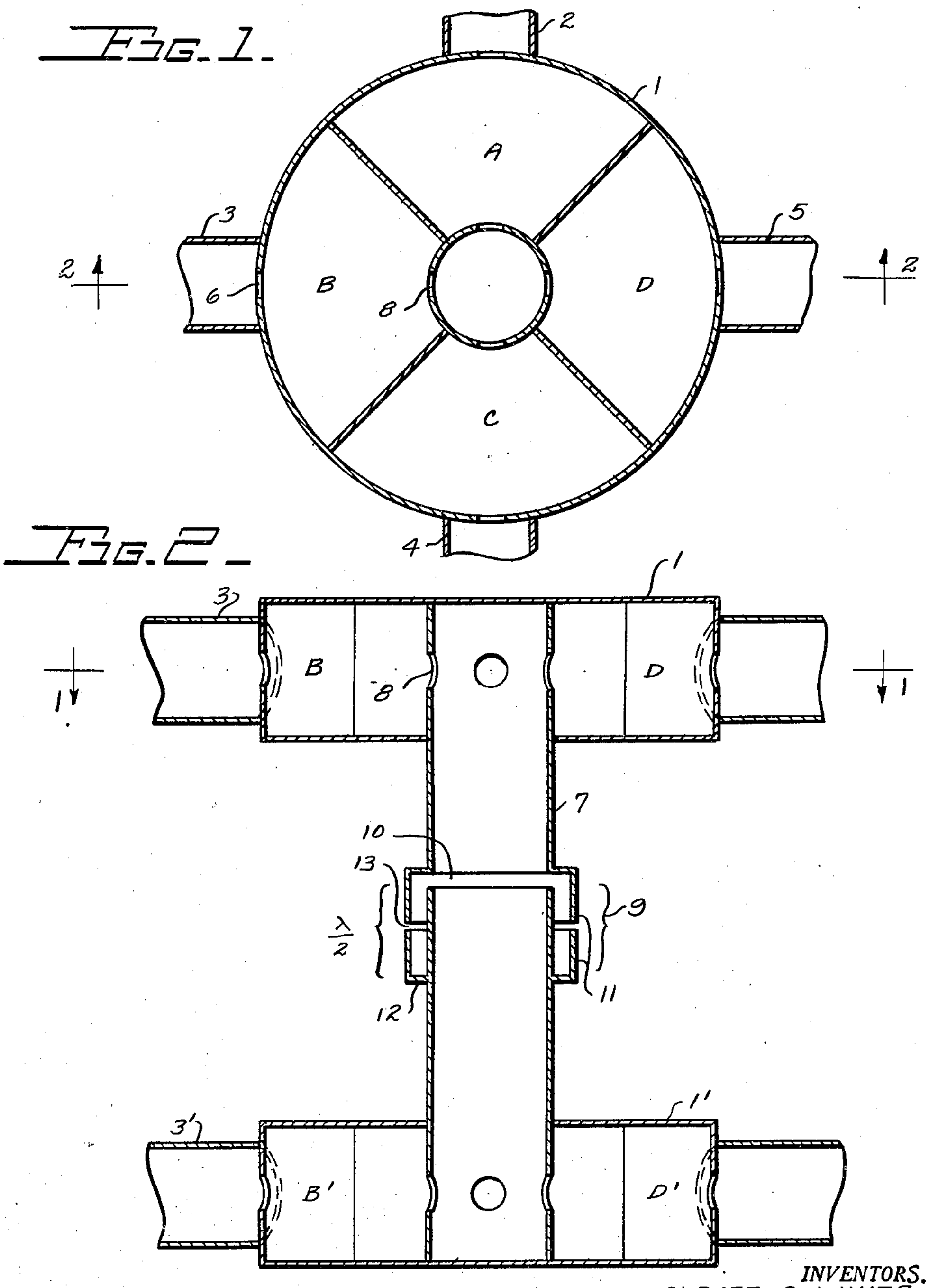
Fig. 1 is a cross-sectional plan view of the rotating filter arrangement and wave transmission means associated therewith.
Fig. 2 is a cross-sectional elevation of coupling network in which the interconnecting transmission means is a cylindrical wave guide.

Figures 1 and 2 show a rotating coupling network capable of accommodating four circuits. The network contains two identical filter assemblies 1 and 1′. Filter assembly 1 consists of four resonant cavities A, B, C and D the dimensions of which are such that each is resonant at the frequency of the energy in a corresponding one of the four circuits. Likewise filter assembly 1′ contains four resonant cavities A′, B′, C′ and D′, only two of which are shown, which are identical to the corresponding cavities in 1 and resonant to the same frequencies. As is well known, a cavity has a very sharp resonance and acts as a highly selective filter which rejects all frequencies except a very narrow band centered on its resonant frequency. Energy is transferred to or from cavities A, B, C and D by wave guides 2, 3, 4 and 5 and similarly energy is transferred to or from cavities A′, B′, C′ and D′ by wave guides 2′, 3′, 4′ and 5′, only two of which are shown. These wave guides are shown as having circular cross-sections but could as well be of rectangular cross-section. Coupling between the wave guides and the cavities may be effected by an aperture as at 6. As a practical example, the wave guides 2 through 5 may be connected to four antennas mounted, together with filter assembly 1, on a rotating structure, and wave guides 2′ through 5′ may be connected to four transmitters which, along with filter 1′, are stationary.

The two filter assemblies are interconnected by a circular wave guide 7 one end of which is coupled to the cavities A, B, C and D and the other end of which is coupled to cavities A′, B′, C′ and D′. Again coupling is effected by an aperture as at 8. At an intermediate point along the wave guide 7 a rotating joint 9 is provided. This joint may be any known type suitable to high frequencies and the type of interconnecting transmission means used. The rotating joint shown in Fig. 2 is suitable for use in cases where the band of frequencies transmitted by wave guide 7 is narrow enough for the percentage change in wavelength over the band to be small. In the rotating joint 9 the impedance at the break 10 between the upper and lower portions of wave guide is caused to be very low by making the annular opening 10 the input to a short-circuited half-wave concentric transmission line formed by the cylindrical member 11 as the outer conductor and that part of the lower portion of wave guide 7 within the member 10 as the inner conductor. This line is short-circuited at its end by annular short circuiting member 12 and has a length equal to one-half the mean wavelength of the frequencies transmitted by wave guide 9. With this arrangement, if the change in wave-length over the transmitted band is small as stated above, the line will have a length equal to or very nearly equal to one half-wave for all frequencies being transmitted. The impedance at the annular joint 10 will therefore be very low since the input impedance of a short-circuited half-wave line with negligible attenuation, as in this case, approaches zero. In order to permit relative rotation of the upper and lower parts of wave guide 7 the cylindrical member 11 is split annularly at 13 midway between the ends of the transmission line formed by this member and the adjacent part of wave guide 7. This break in the outer conductor is permissible since the current at the center of a shorted half-wave line having negligible attenuation is substantially zero. If the wave guide 7 is of the gas filled type a suitable packing may be used to close gap 13.

Figure 3:
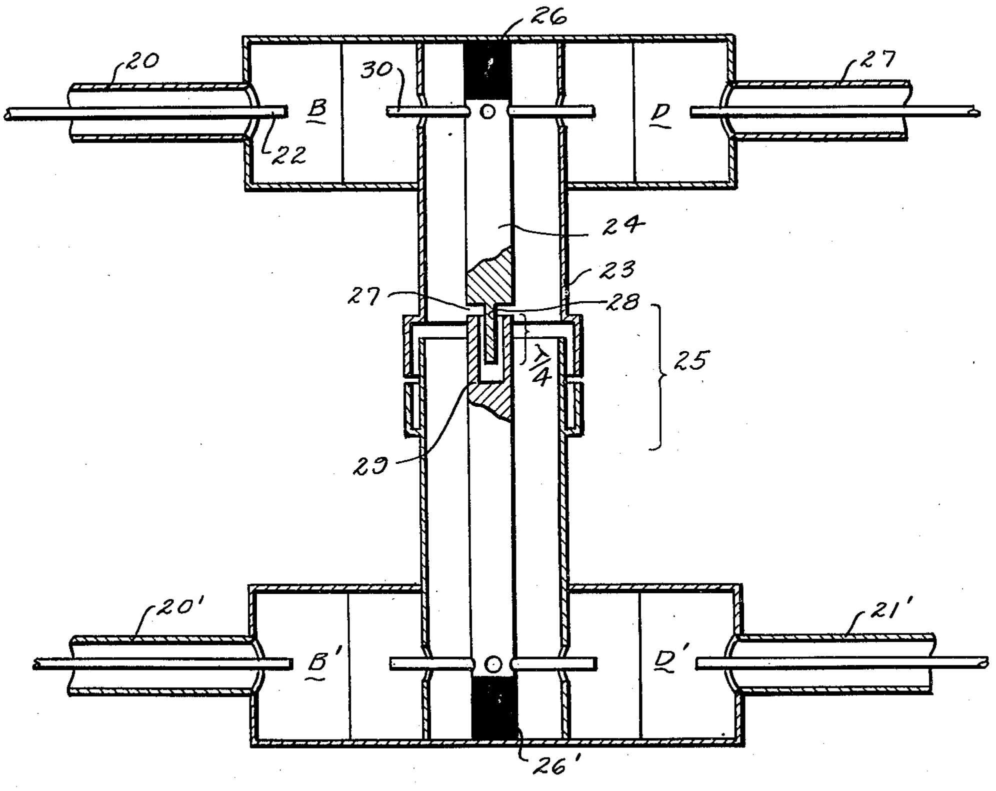
Fig. 3 is a cross-sectional elevation of the coupling network in which the interconnecting transmission means is a coaxial transmission line.

The invention is not limited to use with hollow wave guides as shown in Figs. 1 and 2 but may employ other suitable wave transmission means to connect the filters to the various circuits and to interconnect the two sets of filters. In Fig. 3, 20, 21, 20′ and 21′ are concentric transmission lines for transferring energy to or from cavities B, D, B′ and D′ respectively. Similarly, four additional lines are provided for cavities A, C, A′ and C′ but, like the filters, are not shown in the figure. Each transmission line is coupled to its associated cavity by extending the center conductor a short way into the cavity as at 22.

The two groups of resonant cavities are intercoupled by an additional concentric transmission line having an outer cylindrical conductor 23 and an inner cylindrical conductor 24, and also provided with a rotating joint 25. That part of the rotating joint associated with the outer conductor 23 is identical to rotating joint 9 read in the wave guide 7 of Fig. 2. The center conductor 24 is rigidly supported inside the outer conductor 23 by supports 26 and 26′ of insulating material. Relative rotation of the upper and lower parts of the center conductor is provided for by breaking the conductor at 27. A low impedance across the break 27 is obtained by means of the reduced portion 28 of the upper portion of the center conductor which extends into cylindrical opening 29 in the lower portion a distance equal to one quarter of the wavelength at the middle frequency of the range of frequencies being transmitted. This arrangement provides a quarter-wave open-circuited concentric line having its input end at the annular gap 27. Since the input impedance of such a line approaches zero the impedance across the gap 27 is very low. Coupling between the center conductor 24 and the resonant cavities accomplished by probes which extend from the center conductor into the cavity as at 30.

Figure 4:
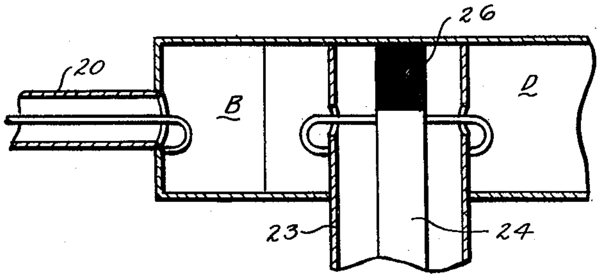
Fig. 4 is a cross-sectional view showing an alternative method of coupling coaxial transmission lines to the filters.

Figure 4 illustrates how the apparatus of Fig. 3 may be modified to use loops instead of probes as coupling means between the concentric lines and the resonant cavities.

The above described networks are bi-directional and are therefore particularly suitable in transmitter-receiver applications where the same antennas are used for both transmission and reception. Identical transmission characteristics in both directions require the use of a group of filters at each end of the interconnecting transmission means in which the rotating joint is located. However, if transmission in only one direction is desired it may be possible in some cases to dispense with the filters as the input end of the coupling network and to couple the driving circuits directly to the interconnecting transmission means.

We claim as our invention:

1. A multi-channel high frequency rotating coupling network comprising a first and a second filter assembly, said first filter assembly containing a plurality of individual filters each designed to pass a different band of frequencies, said second filter assembly containing a corresponding number of individual filters each designed to pass the same band of frequencies as its corresponding filter in the first assembly, individual means for coupling each of the filters in both assemblies to separate external circuits, a cylindrical metallic wave transmission means, means for coupling one end of said wave transmission means to each of the filters in said first assembly, means for coupling the other end of said wave transmission means to each of the filters in said second assembly, and a rotating joint in said wave transmission means intermediate its ends, whereby the external circuits associated with one of said filter assemblies may be rotated relative to the external circuits associated with the other of said filter assemblies about the axis of said wave transmission means.

2. Apparatus as claimed in claim 1 in which said individual filters are resonant cavities.

3. Apparatus as claimed in claim 2 in which said individual means for coupling each of the filters in both assemblies to separate external circuits are hollow wave guides.

4. Apparatus as claimed in claim 3 in which said interconnecting transmission means is a hollow wave guide.

5. Apparatus as claimed in claim 1 in which said individual filters are resonant cavities and said individual means for coupling each of the filters in both assemblies to separate external circuits and said interconnecting transmission means are concentric transmission lines.

ALBERT S. WHITE.
WILLIAM H. RHODES.

REFERENCES CITED

The following references are of record in the file of this patent:

UNITED STATES PATENTS

| Number | Name | Date |
|---|---|---|
| 2,129,712 | Southworth | Sept. 13, 1938 |
| 2,401,344 | Espley | June 4, 1946 |
| 2,407,318 | Mieher | Sept. 10, 1946 |
| 2,419,557 | Friis | Apr. 29, 1947 |
| 2,432,093 | Fox | Dec. 9, 1947 |
| 2,438,119 | Fox | Mar. 23, 1948 |